J. F. GODEFROY & A. J. KUGLER.
GAGE FOR HINGES.
APPLICATION FILED NOV. 20, 1912.

1,128,970.

Patented Feb. 16, 1915.

WITNESSES
Oliver W. Holmes
B. Joffe

INVENTORS
JULES F. GODEFROY,
ALBERT J. KUGLER,
BY Munn & Co
ATTORNEYS

UNITED STATES PATENT OFFICE.

JULES F. GODEFROY AND ALBERT J. KUGLER, OF NEW YORK, N. Y.

GAGE FOR HINGES.

1,128,970.  Specification of Letters Patent.  Patented Feb. 16, 1915.

Application filed November 20, 1912. Serial No. 732,467.

*To all whom it may concern:*

Be it known that we, JULES F. GODEFROY, a citizen of the United States of America, and ALBERT J. KUGLER, a citizen of the Republic of France, and residents of the city of New York, borough of Manhattan, in the county and State of New York, have invented a new and Improved Gage for Hinges, of which the following is a full, clear, and exact description.

This invention relates to a gage or tool to be used in connection with hinges, and which comprises a pair of relatively adjustable heads.

An object of the invention is to provide an inexpensive universal compact gage or tool by means of which holes to be drilled in the object to be hinged will direct the drilling tool at a proper angle to the face of the object and give the required distance between the drilled holes.

The invention consists of the construction and combination of parts to be more fully described hereinafter and fully set forth in the claims.

Figure 1:
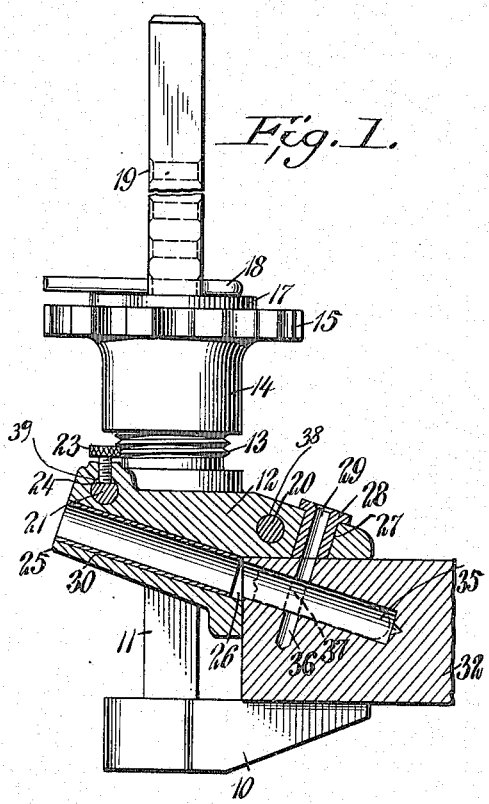
Figure 2:
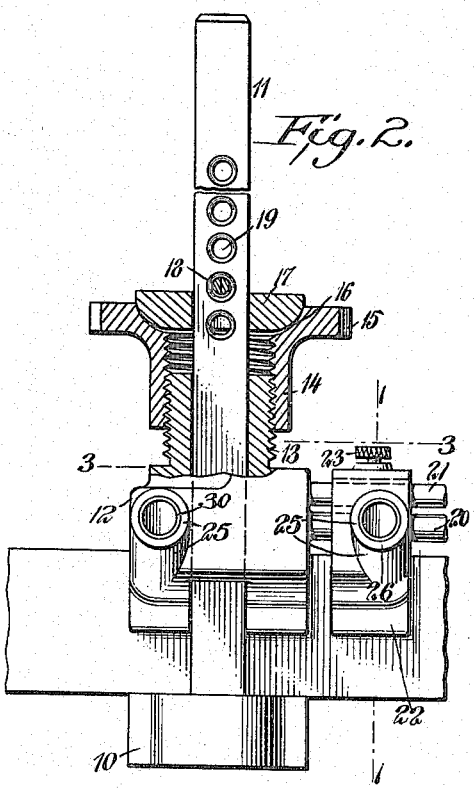
Figure 3:
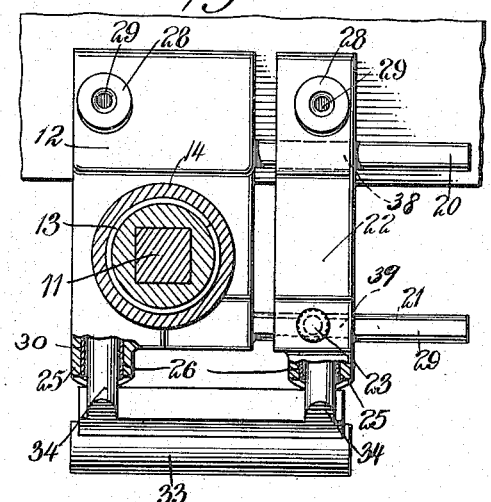

Reference is to be had to the accompanying drawings forming a part of this specification, in which like characters indicate corresponding parts in all the views and in which:

Figure 1 is a side elevation of an embodiment of our invention with the transversely adjustable portion in section; Fig. 2 is an end elevation, partly in section, showing the clamping means on the movable head and shank; Fig. 3 is a section on line 3—3, Fig. 2; and Fig. 4 is a similar section or a modified form of the movable head.

Referring to the drawings, 10 is a stationary head provided with a shank 11, preferably of angular cross-section. A head 12 provided with a central annular aperture is mounted to slide on the shank, whereby the head is movable longitudinally on the shank. The movable head 12 is provided with an upwardly projecting portion 13 threaded exteriorly and engaging a threaded nut 14 provided with a circular grip 15 for the hands. The nut 14, at its upper end, is provided with a concave portion 16 engaging a washer 17 snugly engaging the shank and adapted to bear against a stop formed by a cotter-pin 18 positioned in one of the apertures 19 provided in the shank 11. By means of this nut 14, washer 17 and cotter-pin 18, positioned in the shank, an object can be clamped between the two heads and, as can be seen, objects of different thicknesses may be clamped between the heads. The head 12 is also provided with two guiding arms 20 and 21 projecting transversely to the shank 11 on which a slidable portion 22, forming a part of the head 12, is mounted. The slidable portion 22 is provided with bores 38 and 39 engaging the arms 20 and 21 respectively. A set screw 23 is provided on the portion 22 entering the bore 39 and traveling over a flat portion 24 formed on the transverse guide 21, so that the slidable portion 22 can be clamped at the desired point on the transverse guides 20 and 21. The head 12 and slidable portion 22 are each provided with cylindrical projecting portions 25, lying at the opposite sides of the shank and centrally provided with an aperture 26 making a predetermined angle with the surface of the head engaging the object. In the same plane with the bore 26 an orifice 27 is provided at the end opposite the cylindrical projections 25, said orifice being normal to the axis of the bore 26, and fitted into the orifice 27 is a plug 28 provided with a bore 29, the purpose of which will be described hereinafter. The cross section of the head 12 and the slidable portion 22 are similar and have at the ends, where the plugs 28 are provided, a right-angled recess such that the bore 26 has its upper wall terminating preferably in the angle, so that a drill inserted into the bore 26 will be guided by this bore while drilling into the object supported between the lower and upper heads in such a way that the corner of the object is abutting against the right angle in said recess.

When different sizes of hinges are used the size of the arm of the hinge may be different in cross section, that is, in diameter, and, consequently, different sizes of drills must be used for the bores. To provide for this a series of sleeves of different diameters can be inserted into the bore 26. One of said sleeves 30 is shown positioned in bore 26 in Fig. 1. Either a series of telescopic sleeves may be used or sleeves having different inner diameters to correspond to different sized bores that the practice may require.

Figure 4:
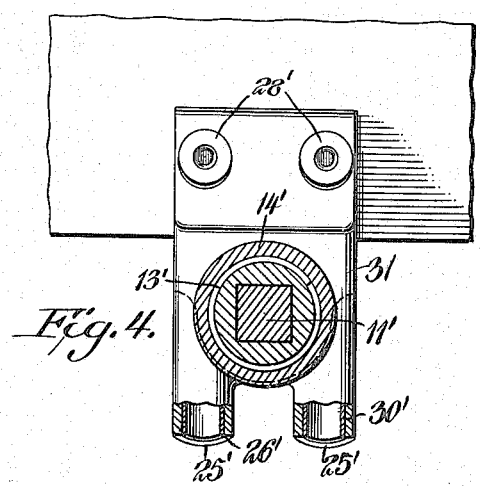

The modified form of our tool, as shown in Fig. 4, differs from the form above described as being provided with a solid head 31, that is one not provided with a slidable portion, so that the distance between the bores 26' is constant and can be used only for a determined distance between the arms of a hinge, while the diameter of the arms of the hinged member may vary, as sleeves may be inserted in the bores similarly as described above. It is similarly provided with plugs 28'.

The application of our tool is as follows: The edge of an object 32 to be provided with the hinge is marked where the hinge is to be positioned and the tool is clamped to the edge so that the head 10 is brought under the lower surface and the head 12 with the movable portion 22 over the upper surface of the object on which the hinge is to be placed with the right angle in the recess in the upper head engaging preferably the corner of the object, then clamping it by placing the cutter-pin 18 in the nearest aperture 19 of the shank and unscrewing the nut 14 from the projection 13 of the head 12 until the nut jams against the washer 17 which bears against the cotter pin 18 and thereby forces the head 12 and the slidable portion 22 toward the head 10 thereby jamming the object between the heads. But previously to jamming tightly the head 12, a hinged member 33 is inserted by means of its arms 34 into the bores 26, in this case provided with sleeves 30, and thereby giving the exact distance between the bores, as this is the hinged member which will be positioned in the object. When the hinged member is so positioned in the head 12 and the slidable portion 22, the same is jammed tightly to the edge; the hinged member is then withdrawn and the holes may be bored in the edge of the object, as shown in Fig. 1, the drill being guided by the sleeve 30 in bore 26. The length of the arm being known the depth of the bore can be easily determined. When the bore is finished for the arms of the hinged member 33, another drill is then inserted into the orifice 29 of the plug 28 positioned in the head 12 and slidable portion 22 and, as above stated, lying in the same plane but normal with the bore 26 and another hole is drilled, in which case the drill is guided by the aperture 29, the depth of this hole being easily determined according to the pin to be used in connection with the arms. The purpose of this hole is to guide the pin to be inserted in the arms 34 preventing the displacement of the hinged member. The bore 35 formed in the object for the arms 34 and the hole 36, formed for the retaining pin, are, as above stated, normal to each other, and the hole 36 is so drilled that the corresponding hole 37 of the arm 34 is, as shown in dotted line in Fig. 1, a little offset from the hole 36, so that when the retaining pin is inserted it will force the hinged member toward the edge of the object.

Having thus described our invention, what we claim and desire to secure by Letters Patent is:

1. A device of the class described comprising two relatively adjustable heads adapted to engage an object, one of said heads having means for directing a bit or a drill obliquely into the object when engaged between said heads and means for directing a drill into said object perpendicularly to the oblique direction.

2. A device of the class described comprising two relatively adjustable heads adapted to engage an object, one of said heads having a pair of bores for directing a drill obliquely into the object when clamped between said heads and at a predetermined angle to the object, and another pair of bores for directing a drill into the side of the object perpendicularly to the direction of the first-mentioned bores.

3. A device of the class described comprising two relatively adjustable heads adapted to engage an object, one of said heads having a shank engaging the second of said heads; means on said shank and said second head to cause said head to engage an object, said second head having one pair of bores for directing a drill obliquely into the object, and another pair of bores for directing a drill in the side of the object at an angle to the obliquely directed bores.

4. A device of the class described comprising two relatively adjustable heads adapted to engage an object; one of said heads having a shank engaging the second of said heads; means on said shank and said second head to cause said heads to engage an object, one of said heads having one pair of bores for directing a drill obliquely into the object when engaged between said heads, and another pair of bores for directing a drill into the object at an angle to the first of said pair of bores, the axes of the second of said bores being in the same plane respectively with the axes of the first pair of said bores.

5. A device of the class described comprising a head having a shank perpendicular to the head; a second head slidably mounted on said shank and coacting with the first head, said second head having a threaded projection; a circular nut having a concave portion in its upper end and in threaded engagement with said projection; a washer in said concave portion engaging said shank; and a pin adjustably mounted on said shank forming a bearing for said washer, said second head having an angular recess the angle of which forms an abutment for an object engaged between the heads, and a pair of through bores parallel to each other inclined toward the projection, also another pair of through bores parallel to each other and perpendicular to the first-mentioned bores.

6. A device of the class described comprising a head having a shank perpendicular to said head; a second head slidably mounted on said shank coacting with said first head, said second head having an angular recess the angle of which forms an abutment for the object engaged between said heads; a threaded projection on said second head engaging the shank; a circular nut having a curved recess at one end and engaging said projection; a washer having a curved surface on said shank positioned in said recess, said shank having a series of superposed apertures; and a removable pin in one of said apertures forming a stop for said washer when said heads are made to engage an object, said second head having a pair of through bores parallel to each other leading to said recess at a predetermined angle, and another pair of parallel bores normal to the above-mentioned bores.

7. A device of the class described comprising a head having a shank extending perpendicularly thereto; a second head slidably mounted on said shank and coacting with the first of said heads; means on said second head and said shank for forcing said second head against the first, said second head comprising two portions; means whereby said portions may be relatively adjusted, each of said portions having two bores normal to each other and making predetermined angles with the shank.

8. A device of the class described comprising a head having a shank normal thereto; a second head formed of two portions relatively adjustable to each other and coacting with said first head, one of said portions having means coacting with said shank for forcing said portions against the first of said heads, each of said portions having a bore at a predetermined angle to the shank, said bores being parallel to each other, means for relatively adjusting said portions, each of said portions having a second bore substantially perpendicular to the first-mentioned bore.

9. A device of the class described comprising a head having a shank perpendicular thereto; a second head formed of two portions coacting with the first head; means for relatively adjusting the said portions; means on one of said portions and said shank for forcing the said portions against the first of said heads; a pair of parallel arms projecting from one of said portions transversely of said shank, the other of said portions having means for engaging said arms; means on said second portion coacting with said arms whereby the said portion can be placed at any desired distance from the first of said portions, said portions having an angular recess the angle of which forms an abutment for the object engaged between the heads, and also having means for guiding a drill into the side and edge of the object.

10. A device of the class described comprising, two relatively adjustable heads adapted to engage an object, one of said heads having a shank engaging the second of said heads; means on said shank on said second head to cause said heads to engage an object, one of said heads having means whereby a drill can be directed obliquely into the object, and also means whereby a drill can be directed transversely to the first direction and cross the same in the object.

11. A device of the class described comprising two relatively adjustable heads adapted to engage an object, one of said heads having a shank engaging the second of said heads; means on said shank and said second head to cause said heads to engage said object, one of said heads having a plurality of bores whereby drills can be directed obliquely into the said object engaged between the heads, and also perpendicular to the first direction and crossing the same in the object.

12. A device of the class described comprising a pair of relatively adjustable heads adapted to engage an object, one of said heads having a shank engaging the second of said heads; means on said second head for causing the heads to engage an object between them, said second head being formed of two portions; and means for relatively adjusting said portions in a direction transverse to said shank, each of said portions having a bore adapted to direct a drill obliquely into said object.

13. A device of the class described comprising a pair of relatively adjustable heads adapted to engage an object, one of said heads having a shank engaging the second of said heads; means on said shank and said second head for causing the heads to engage between them the object, said second head being formed of two portions; means for relatively adjusting said portions in a direction transverse to said shank, each of said portions having a bore adapted to direct a drill obliquely into said object and another bore adapted to direct a drill into the said object so as to cross the path of the first bore in the object.

14. A device of the class described comprising two relatively adjustable heads adapted to engage an object; a shank on one of said heads engaging the second head, one of said heads having a series of spaced parallel bores for directing a drill obliquely into the object and another series of spaced parallel bores for directing a drill into the object perpendicular to the first stated direction, said head provided with the bores being formed of two portions; and means whereby one of said portions may be adjusted relative to the other, said adjustable portion having one of the parallel bores of each of said series.

15. A device of the class described comprising,—two relatively adjustable heads adapted to engage an object, one of said heads having a shank, the other head being mounted for movement on said shank, a member rotatively connected with said head, means between said member and head whereby rotation of one with reference to the other will cause longitudinal movement of one relatively to the other, said shank being provided with a plurality of spaced apertures, and a stop adapted to be placed in any one of said apertures to coact with said member, one of said heads being provided with means to direct a bit or a drill into an object clamped between said heads.

In testimony whereof we have signed our names to this specification in the presence of two subscribing witnesses.

JULES F. GODEFROY.
ALBERT J. KUGLER.

Witnesses:
BENEDICT JOFFE,
PHILIP D. ROLLHAUS.

Copies of this patent may be obtained for five cents each, by addressing the "Commissioner of Patents, Washington, D. C."